United States Patent
Liu et al.

(10) Patent No.: US 8,900,755 B2
(45) Date of Patent: Dec. 2, 2014

(54) LITHIUM SUPER-BATTERY WITH A CHEMICALLY FUNCTIONALIZED DISORDERED CARBON CATHODE

(75) Inventors: Chenguang Liu, Fairborn, OH (US); Aruna Zhamu, Centerville, OH (US); David Neff, Fairborn, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 239 days.

(21) Appl. No.: 12/924,211

(22) Filed: Sep. 23, 2010

(65) Prior Publication Data

US 2012/0077080 A1   Mar. 29, 2012

(51) Int. Cl.
| | | |
|---|---|---|
| *H01M 4/13* | (2010.01) | |
| *H01M 4/587* | (2010.01) | |
| *H01G 11/06* | (2013.01) | |
| *H01G 11/38* | (2013.01) | |
| *H01G 11/50* | (2013.01) | |
| *H01M 10/0525* | (2010.01) | |
| *H01M 4/485* | (2010.01) | |
| *H01M 4/58* | (2010.01) | |
| *H01M 4/02* | (2006.01) | |

(52) U.S. Cl.
   CPC .............. *H01M 4/587* (2013.01); *H01G 11/06* (2013.01); *H01G 11/38* (2013.01); *H01G 11/50* (2013.01); *H01M 10/0525* (2013.01); *H01M 4/485* (2013.01); *H01M 4/5825* (2013.01); *H01M 2004/021* (2013.01); *Y02E 60/122* (2013.01); *Y02E 60/13* (2013.01)
   USPC .................. 429/231.8; 429/231.7; 429/231.95

(58) Field of Classification Search
   USPC ............................... 429/231.8, 231.95, 231.7
   See application file for complete search history.

(56) References Cited

U.S. PATENT DOCUMENTS

| | | | | |
|---|---|---|---|---|
| 4,464,447 A | * | 8/1984 | Lazzari et al. | 429/338 |
| 4,835,074 A | * | 5/1989 | Bolster et al. | 429/402 |
| 5,565,284 A | * | 10/1996 | Koga et al. | 429/217 |
| 5,965,296 A | * | 10/1999 | Nishimura et al. | 429/231.8 |
| 6,139,989 A | * | 10/2000 | Kawakubo et al. | 429/231.8 |
| 7,623,340 B1 | | 11/2009 | Song et al. | |
| 2005/0239917 A1 | * | 10/2005 | Nelson et al. | 523/160 |
| 2009/0047579 A1 | * | 2/2009 | Jang et al. | 429/231.8 |

OTHER PUBLICATIONS

U.S. Appl. No. 11/800,728, filed May 8, 2007, A. Zhamu, et al.
U.S. Appl. No. 12/806,679, filed Aug. 19, 2010, C. G. Liu.

* cited by examiner

Primary Examiner — Zachary Best

(57) ABSTRACT

An electrochemical energy storage device, lithium super-battery, comprising a positive electrode, a negative electrode, a porous separator disposed between the two electrodes, and a lithium-containing electrolyte in physical contact with the two electrodes, wherein the positive electrode comprises a disordered carbon material having a functional group that reversibly reacts with a lithium atom or ion. The disordered carbon material is selected from a soft carbon, hard carbon, polymeric carbon or carbonized resin, meso-phase carbon, coke, carbonized pitch, carbon black, activated carbon, or partially graphitized carbon. In a preferred embodiment, a lithium super-battery having a functionalized disordered carbon cathode and a $Li_4Ti_5O_{12}$ anode exhibits a gravimetric energy ~5-10 times higher than those of conventional supercapacitors and a power density ~10-30 times higher than those of conventional lithium-ion batteries. This device has the best properties of both the lithium ion battery and the supercapacitor.

31 Claims, 11 Drawing Sheets

Soft carbon

Hard carbon

Carbon Black macro- or
meso-pores

LITHIUM SUPER-BATTERY WITH A CHEMICALLY FUNCTIONALIZED DISORDERED CARBON CATHODE

This invention is based on the research results of a project sponsored by the US Department of Commerce NIST Technology Innovation Program (TIP).

FIELD OF THE INVENTION

The present invention relates generally to the field of electrochemical energy storage device and more particularly to a new lithium-exchanging battery device featuring a cathode formed of functionalized disordered carbon and an anode containing a lithiated compound or lithium-containing material. This device has the high energy density of a lithium-ion battery and the high power density of a supercapacitor and, hence, is herein referred to as a lithium super-battery.

BACKGROUND OF THE INVENTION

Supercapacitors are being considered for electric vehicle (EV), renewable energy storage, and modern grid applications. The high volumetric capacitance density of a supercapacitor (10 to 100 times greater than those of electrolytic capacitors) derives from using porous electrodes to create a large surface area conducive to the formation of diffuse double layer charges. This electric double layer (EDL) is created naturally at the solid-electrolyte interface when voltage is imposed. This implies that the specific capacitance of a supercapacitor is directly proportional to the specific surface area of the electrode material, e.g. activated carbon. This surface area must be accessible by electrolyte and the resulting interfacial zones must be sufficiently large to accommodate the EDL charges. In some supercapacitors, the stored energy is further augmented by pseudo-capacitance effects due to some electrochemical reactions (e.g., redox).

Since the formation of EDLs does not involve a chemical reaction, the charge-discharge process of an EDL supercapacitor can be very fast, typically in seconds, resulting in a very high power density (typically 5,000-10,000 W/Kg). Compared with batteries, supercapacitors offer a higher power density, require no maintenance, offer a much higher cycle-life, require a very simple charging circuit, experience no "memory effect," and are generally much safer. Physical, rather than chemical, energy storage is the key reason for their safe operation and extraordinarily high cycle-life.

Despite the positive attributes of supercapacitors, there are several technological barriers to widespread implementation of supercapacitors for various industrial applications. For instance, supercapacitors possess very low energy densities when compared to batteries (e.g., 5-8 Wh/kg for commercial supercapacitors vs. 10-30 Wh/Kg for the lead acid battery and 50-100 Wh/kg for the NiMH battery). On the other hand, lithium-ion batteries possess a much higher energy density (100-180 Wh/kg), but deliver a very low power density (100-500 W/Kg), requiring typically hours for re-charge. Conventional lithium-ion batteries also pose some safety concern.

The low power density or long re-charge time of a lithium ion battery is due to the mechanism of shuttling lithium ions between a negative electrode (anode) and a positive electrode (cathode), which requires lithium ions to enter or intercalate into, for instance, inter-planar spaces of a graphite crystal at the anode during re-charge, and into the complex cathode crystals (e.g. lithium cobalt oxide, lithium iron phosphate, or other lithium insertion compound) during discharge. This intercalation or diffusion process requires a long time to accomplish because solid-state diffusion (or diffusion inside a solid) is difficult and slow. For instance, the current lithium-ion battery for plug-in hybrid vehicles requires 2-6 hours of recharge time, as opposed to just seconds for supercapacitors. The above discussion suggests that an energy storage device that is capable of storing as much energy as in a battery and yet can be fully recharged in one or two minutes like a supercapacitor would be considered a revolutionary advancement in energy technology.

Instead of using an inorganic lithium insertion compound, such as $LiCoO_2$ and $LiFePO_4$, that requires lithium insertion into and extraction from a bulk inorganic particle (typically 100 nm-20 µm, but more typically 1-10 µm), several attempts have been made to use organic molecules or polymers as an electrode active material for the cathode (lithium metal as the anode). For instance, Le Gall, et al investigated Poly(2,5-dihydroxy-1,4-benzoquinone-3,6-methylene) as an organic polymer cathode [T. Le Gall, et al. J. Power Sources, 119 (2003) 316-320] and Chen, et al used $Li_xC_6O_6$ organic electrode, obtained from a renewable source, in a lithium ion battery [H. Chen, et al. "From biomass to a renewable $Li_xC_6O_6$ organic electrode for sustainable Li-ion batteries," ChemSusChem, 1 (2008) 348-355]. Unfortunately, these organic materials exhibit very poor electronic conductivity and, hence, electrons could not be quickly collected or could not be collected at all. Although these organic molecules contain carbonyl groups ($>C=O$) that presumably could readily react with lithium ions (forming a redox pair), this redox mechanism was overwhelmed by the poor electronic conductivity. As a result, the battery cells featuring these organic molecules exhibit poor power densities. Le Gall et al added a large proportion of conductive acetylene black (typically 40-60% by weight) to partially overcome the conductivity issue; but, acetylene black significantly dilutes the amount of the active material. Further, the best achievable specific capacity of 150 mAh/g is far less than the theoretical specific capacity of 705 mAh/g of Poly(2,5-dihydroxy-1,4-benzoquinone-3,6-methylene).

Recently, more electrically conducting carbon nano-tubes (CNTs) containing carbonyl groups were used by Lee, et al to replace the organic molecules for use as a cathode material [S. W. Lee, et al, "High Power Lithium Batteries from Functionalized Carbon Nanotubes," *Nature Nanotechnology*, 5 (2010) 531-537]. The significantly higher electronic conductivity of CNTs does serve to overcome the poor conductivity problem of organic molecules. However, the CNT-based approach still suffers from several relatively insurmountable technical and economical issues, which call into question the commercial viability or utility value of this approach. Some of these issues are:

(1) CNTs are known to be extremely expensive due to the low yield, low production rate, and low purification rate commonly associated with the current CNT preparation processes. The high material costs have significantly hindered the widespread application of CNTs.

(2) CNTs tend to form a tangled mess resembling a hairball, which is difficult to work with (e.g., difficult to disperse in a liquid solvent or resin matrix).

(3) The so-called "layer-by-layer" approach (LBL) used by Lee, et al is a slow and expensive process that is not amenable to large-scale fabrication of battery electrodes, or mass production of electrodes with an adequate thickness (100-300 µm thick).

(4) The CNT electrodes prepared by the LBL process have their thicknesses in the range of 0.3-3.0 µm. Unfortunately, the data provided by Lee, et al (e.g. FIG. S-7 of the Supporting Material of Lee, et al) show that the power density dropped by one order of magnitude when the LBL CNT electrode thickness was increased from 0.3 µm to 3.0 µm. A useful battery or supercapacitor electrode thickness is typically in the range of 50-500 µm (more typically 100-300 µm).

(5) Although the ultra-thin LBL CNT electrodes provide a high power density (since Li ions only have to travel an extremely short distance), there was no data to prove that CNT-based electrodes of practical thickness could even work due to the poor dispersion and electrolyte inaccessability issues. Lee, et al showed that the CNT-based composite electrodes prepared without using the LBL approach did not exhibit particularly good performance.

(6) CNTs have very limited amount of suitable sites to accept a functional group without damaging the basal plane or graphene plane structure. A CNT has only one end that is readily functionalizable and this end is an extremely small proportion of the total CNT surface. By chemically functionalizing the exterior basal plane, one would dramatically compromise the electronic conductivity of a CNT.

Hence, there exists an urgent need to develop a new class of highly conducting electrode materials having a functional group that is capable of rapidly and reversibly forming a redox reaction with lithium ions. These materials must have an adequate amount of readily functionalizable sites to host a desired amount of useful functional groups. These materials must be mass-producible with low costs. These materials must be stable in a wide temperature range (e.g. −40° C. to 60° C., a commonly operating range for a battery). After an extensive and intensive research and development work, we have discovered a new type of electrode materials that meet this set of stringent technical and economical requirements.

This new type of materials includes a chemically functionalized disordered carbon material having certain specific functional groups capable of reversibly and rapidly forming a redox pair with a lithium ion during the charge and discharge cycles of a battery cell. The functionalized disordered carbon is used in the cathode (not the anode) of the presently invented lithium super-battery. In this cathode, lithium ions in the liquid electrolyte only have to migrate to the edges or surfaces of aromatic ring structures or small graphene sheets in a disordered carbon matrix. No solid-state diffusion is required. In contrast, carbon or graphite is used as an anode active material in current or prior art lithium-ion batteries, wherein lithium ions must diffuse into and out of the inter-graphene spaces of a graphite crystal.

Specifically, two types of disordered carbon (soft carbon and hard carbon) have been commonly used in the anode of conventional lithium-ion batteries, wherein inter-planar spaces in a graphite crystal serve as a host for lithium ions to intercalate in and out. This energy storage mechanism in the anode is based on lithium intercalation into the crystal structure. Further, in the conventional lithium ion battery, the cathode active material is typically a lithium intercalation compound, such as $LiCoO_2$ and $LiFePO_4$, rather than a carbon or graphite material. In the conventional lithium ion battery, lithium ions or atoms are intercalated or inserted into the interior crystal structure of a carbon/graphite anode (during the charging procedure) or a non-carbon-based lithium intercalation compound (during discharge). This insertion or extraction procedure is slow. Due to this slow process of lithium diffusion in and out of these intercalation compounds (a solid-state diffusion process), the conventional lithium ion batteries do not exhibit a high power density and the batteries require a long re-charge time. None of these conventional devices rely on select functional groups (e.g. attached at the edge or basal plane surfaces of a graphite crystal in a non-crystalline carbon matrix) that readily and reversibly form a redox reaction with a lithium ion from a lithium-containing electrolyte.

In contrast, the presently invented lithium super-battery relies on the operation of a fast and reversible reaction between a functional group (attached or bonded to a disordered carbon structure) and a lithium ion in the electrolyte. Lithium ions coming from the anode side through a separator only have to diffuse in the liquid electrolyte residing in the cathode to reach a surface/edge of a cathode active material domain. These lithium ions do not need to diffuse into or out of a solid particle. Since no diffusion-limited intercalation is involved, this process is fast and can occur in seconds or even shorter. Hence, this is a totally new class of hybrid supercapacitor-battery that exhibits an unparalleled and unprecedented combined performance of an exceptional power density, high energy density, long and stable cycle life, and wide operating temperature range. This device has the best of both worlds (battery and supercapacitor).

SUMMARY OF THE INVENTION

This invention provides an electrochemical energy storage device comprising a positive electrode, a negative electrode, a porous separator disposed between the two electrodes, and a lithium-containing electrolyte in physical contact with the two electrodes, wherein the positive electrode comprises a chemically functionalized disordered carbon (f-DC) having a functional group that reversibly reacts with a lithium atom or ion. The positive electrode preferably has a thickness greater than 10 µm, more preferably greater than 50 µm, and most preferably greater than 100 µm.

The disordered carbon (DC) material may be selected from a soft carbon, hard carbon, polymeric carbon or carbonized resin, meso-phase carbon, coke, carbonized pitch, carbon black, activated carbon, or partially graphitized carbon. The disordered carbon material is typically formed of two phases wherein a first phase is small graphite crystal(s) or stack(s) of graphene planes and a second phase is non-crystalline carbon and wherein the first phase is dispersed in the second phase or bonded by the second phase.

Preferably, the disordered carbon material contains less than 95% by volume of graphite crystals (preferably less than 90%, further preferably less than 80%) and at least 5% by volume of non-graphitic or non-crystalline carbon. The disordered carbon material preferably has a porous structure having a pore size in the range of 1 nm and 50 nm. Preferably, the disordered carbon material is porous and is characterized by having a specific surface area of at least 100 $m^2/g$, more preferably at least 500 $m^2/g$, still more preferably at least 1,000 $m^2/g$, and most preferably at least 1,500 $m^2/g$.

The desired functional group capable of rapidly and reversibly reacting with a lithium ion or atom in the electrolyte may be selected from —COOH, =O, —OH, —NH$_2$, —OR, —COOR, or an oxygen-containing group attached to a carbon atom (e.g. at the edge surface of a graphite crystal), where R is a hydrocarbon radical.

The negative electrode (anode) comprises an electrode active material capable of absorbing or desorbing lithium. A wide range of electrode active materials may be used for this purpose, including those that are traditionally used as an anode active material or those traditionally used as a cathode active material of a conventional lithium-ion battery.

For instance, quite surprisingly, the electrode active material herein used at the anode of a lithium super-battery may be selected from those materials that are commonly used as a cathode active material in a conventional lithium-ion or lithium metal battery (e.g., as illustrated in FIG. 1(D) and FIG. 1(E)). These include, as examples, lithium cobalt oxide, lithium nickel oxide, lithium manganese oxide, lithium manganese oxide, lithium vanadium oxide, lithium mixed metal oxide, lithium iron phosphate (FIG. 1(B)), lithium vanadium phosphate, lithium manganese phosphate, a lithium transition metal phosphate, lithium mixed metal phosphate, lithiated metal sulfide, or a combination thereof. These are what used to be cathode materials in the prior art lithium ion batteries, but are now anode materials in the presently invented lithium super-battery. This is another manifestation of the uniqueness of this new class of lithium battery.

Alternatively and preferably, the electrode active material in the anode of the presently invented lithium super-battery is selected from, as examples, lithium metal (FIG. 1(A)), a lithium metal alloy, a lithiated compound, a mixture of lithium or lithium alloy with a lithium intercalation compound (e.g., Li powder or Li foil mixed with Si or Sn, etc.), lithiated titanium dioxide, lithium titanate, lithium manganate, a lithium transition metal oxide, $Li_4Ti_5O_{12}$ (FIG. 1(C)), or a combination thereof. These lithium-containing materials or lithiated compounds are commonly used as an anode active material in a conventional lithium-ion battery. Actually, these lithium-containing or lithiated compounds are preferred anode materials for use in the presently invented lithium super-battery.

The lithium intercalation compound for use as an anode active material of the presently invented lithium super-battery may be selected from the following groups of materials, which are capable of absorbing or desorbing lithium ions or atoms:

(a) Silicon (Si), germanium (Ge), tin (Sn), lead (Pb), antimony (Sb), bismuth (Bi), zinc (Zn), aluminum (Al), Titanium (Ti), cadmium (Cd), and their lithiated versions (e.g. lithium-containing Si, Ge, etc.);

(b) The alloys or intermetallic compounds of Si, Ge, Sn, Pb, Sb, Bi, Zn, Al, Ti, or Cd (stoichiometric or non-stoichiometric with other elements) and their lithiated versions (e.g., lithium containing SiSn alloy);

(c) The oxides, carbides, nitrides, sulfides, phosphides, selenides, tellurides, antimonides, or their mixtures (e.g., co-oxides or composite oxides) of Si, Ge, Sn, Pb, Sb, Bi, Zn, Al, Fe, Ti, Co, Ni, Mn, or Cd. For instance, SnO or $SnO_2$ may be admixed with oxides of B, Al, P, Si, Ge, Ti, Co, Ni, Mn, Fe, or Zn and then subjected to heat treatments to obtain composite oxides. Co-oxides can contain lithium oxide; e.g., lithium transition metal oxides. Composite oxides may also be prepared by mechanical alloying (e.g., ball milling of a mixture of SnO and $B_2O_3$). SnO or $SnO_2$ alone is of particular interest due to their high theoretical capacities. Iron oxide or phosphate is of interest since $Li_6Fe_2O_3$ has a theoretical capacity of 1,000 mAh/g. The first cycle capacity of $Fe_3PO_7$ is found to reach 800 mAh/g. The capacity of $SnS_2$ is as high as 620 mAh/g and is stable under charge-discharge cycling conditions; and (d) Salts or hydroxides of Sn, e.g., $SnSO_4$ (with a reversible of 600 mAh/g), $Sn_2PO_4Cl$, (300 mAh/g even after 40 cycles), and $Sn_3O_2(OH)_2$ (300 mAh/g).

The electrode active material is preferably in a fine powder form having a dimension less than 1 μm, further preferably less than 0.5 μm, and most preferably less than 100 nm.

The disordered carbon could have an oxygen content in the range of 5% to 45% by weight, preferably in the range of 5% to 35% by weight, and more preferably in the range of 10% to 25% by weight. Typically, a high oxygen content means a higher amount of oxygen-containing functional groups. However, an ultra-high oxygen content could mean an excessively high oxidation level that results in a low electrical conductivity of the disordered carbon material.

A particularly desirable group of the anode active materials for use in the presently invented super-batteries include lithiated titanium dioxide, lithium titanate, lithium manganate, a lithium transition metal oxide, and, particularly, $Li_4Ti_5O_{12}$.

Any electrolyte used in a conventional lithium-ion or lithium-metal battery can be used as an electrolyte in the presently invented lithium super-battery. Actually, there is no particular limitation on the type of electrolytes that can be used. However, they preferably contain lithium or lithium ions. They can contain any lithium salt. They can also contain a lithium salt-doped ionic liquid.

At least one of the two electrodes can further comprise a nano material selected from a carbon nano-tube, carbon nano-fiber, nano-wire, metal oxide nano-wire or fiber, conductive polymer nano-fiber, or a combination thereof, to provide other desired properties (e.g. conductivity and/or structural integrity).

The lithium super-battery typically provides an energy density much higher than 100 Wh/kg and power density no lower than 15 Kw/kg, all based on the total functionalized electrode weight. In many cases, the energy density is higher than 200 Wh/kg and power density higher than 10 Kw/kg. In other cases, the energy density is greater than 300 Wh/kg and power density greater than 5 Kw/kg.

Another preferred embodiment of the present invention is a process for producing functionalized disordered carbon (f-DC) electrodes in lithium super-batteries. One of the preferred processes comprises the following steps:

(a) Exposing a disordered carbon material in a powder form (e.g., carbon black, polymeric resin, petroleum coke, etc) to a pore-forming or pore-opening treatment; e.g. by immersing the disordered carbon powder in a mixture of concentrated sulfuric acid and nitric acid, or a NaOH or KOH melt for a period of time sufficient to obtain a porous structure;

(b) Exposing the resulting porous structure to a liquid containing a functionalizing agent (e.g., an oxidizing agent such as sulfuric acid, nitric acid, hydrogen peroxide or, preferably, carboxylic acid, formic acid, etc., which is a source of —COOH group) to form a suspension. Optionally, ultrasonication may be used to help attach desired functional groups to the porous structure of a disordered carbon material, resulting in the formation of functionalized disordered carbon. The functionalizing agent may be an amine- or —NH2-containing group, as used in several common curing agents for epoxy resins; and (c) Removing the liquid to recover porous, functionalized carbon containing desired functional groups.

DESCRIPTION OF THE PREFERRED EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting the claimed invention.

Figure 1:
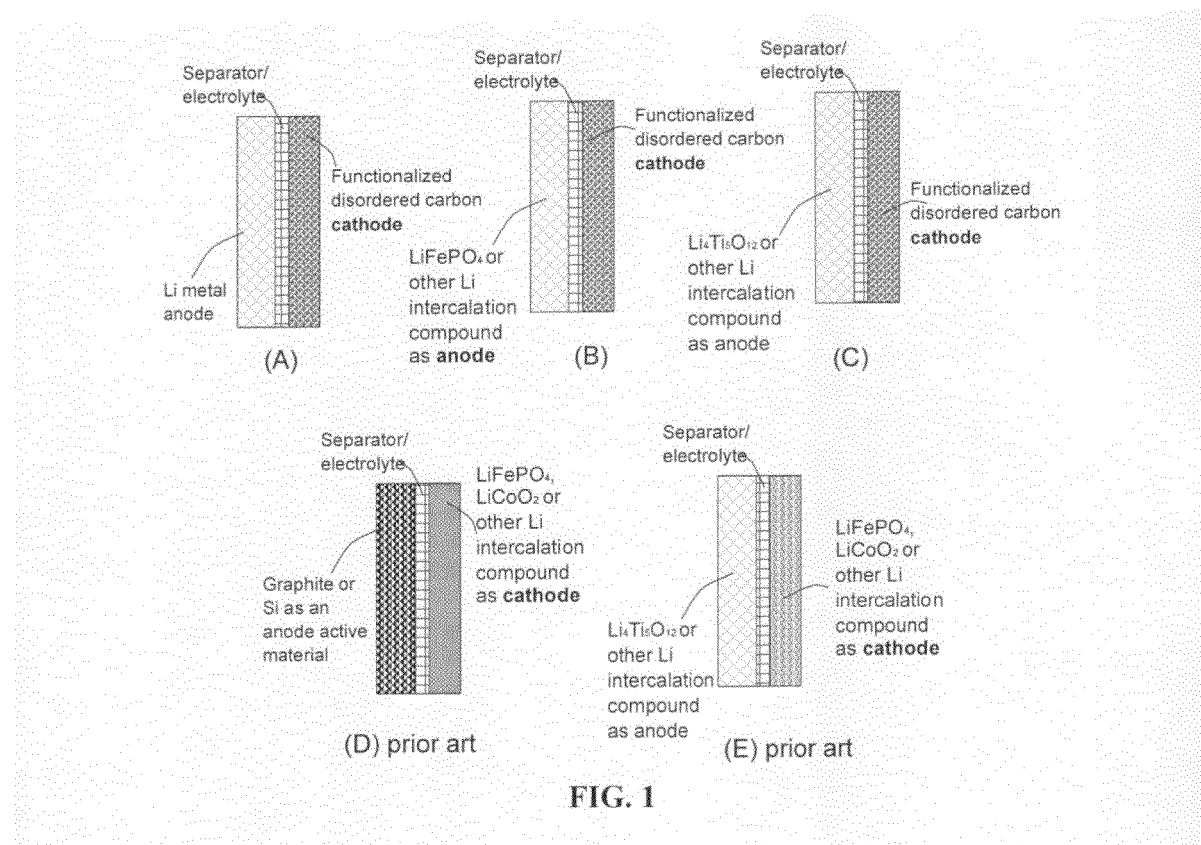
FIG. 1 (A) a lithium super-battery cell with a lithium metal anode and a cathode made of functionalized disordered carbon; (B) a lithium super-battery cell with a lithium iron phosphate anode and a cathode made of functionalized disordered carbon powder (it may be noted that lithium iron phosphate is commonly used as a cathode material in a conventional lithium-ion battery); (C) a lithium super-battery cell with a lithium titanate anode and a cathode made of functionalized disordered carbon; (D) a prior art lithium ion battery cell using graphite or Si as an anode active material and lithium iron phosphate (or lithium cobalt oxide, etc) as a cathode active material; and (E) a prior art lithium ion battery cell using lithium titanate as an anode active material and lithium iron phosphate (or lithium cobalt oxide, etc) as a cathode active material.

This invention provides an electrochemical energy storage device that is herein referred to as a super-battery because it exhibits a high power density of a supercapacitor and a high energy density of a battery. This super-battery is composed of a positive electrode, a negative electrode, a porous separator disposed between the two electrodes, and a lithium-containing electrolyte in physical contact with the two electrodes. A particularly important feature of the positive electrode is that it comprises a chemically functionalized disordered carbon having a functional group that is capable of reversibly reacting with a lithium atom or ion during the charge and discharge cycles. Although there is no limitation on the electrode thickness, the presently invented positive electrode preferably has a thickness greater than 10 μm, more preferably greater than 50 μm, and most preferably greater than 100 μm. A few examples of such a super-battery are given in FIG. 1(A)-(C).

Figure 2:
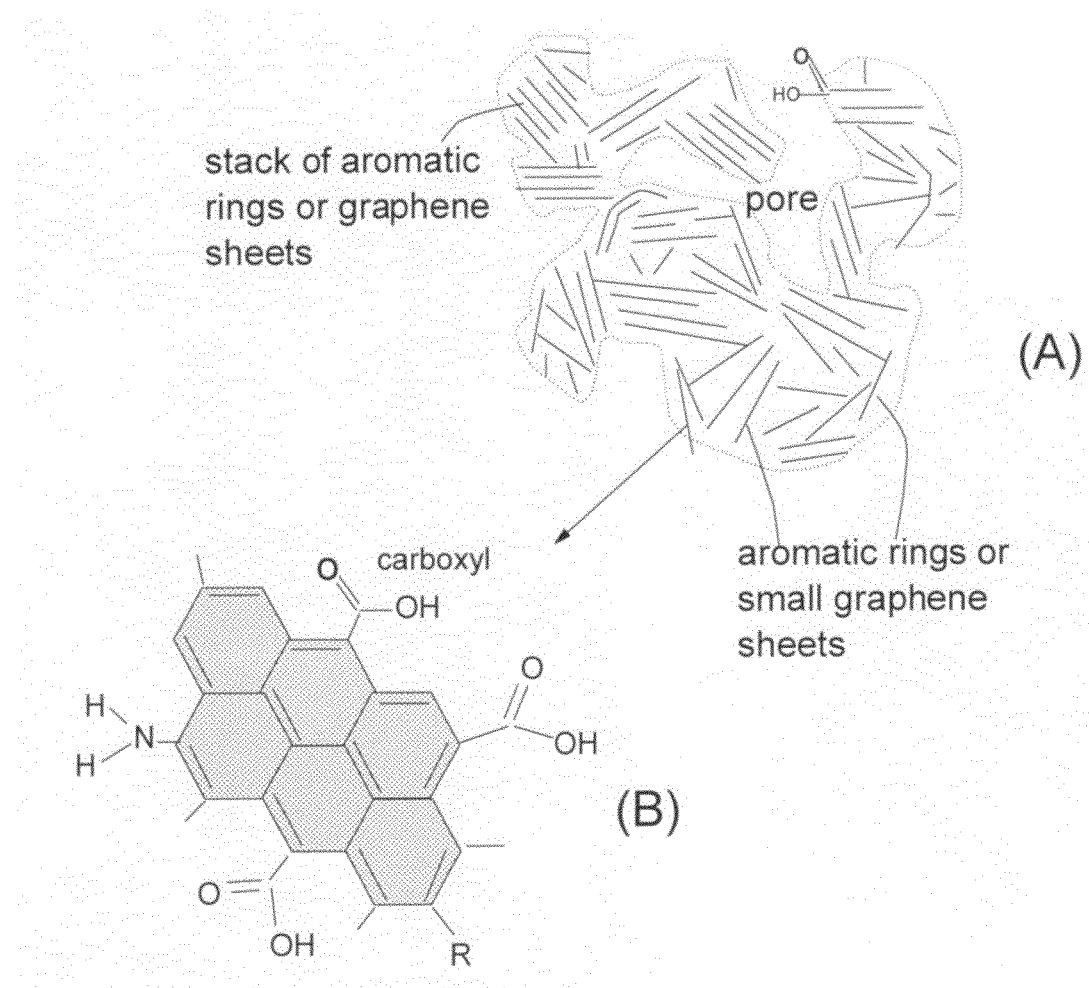
FIG. 2 (A) Schematic of a typical structure of a disordered carbon that is highly porous with pores accessible by liquid electrolyte in such a manner that the functional groups attached to an edge or surface of an aromatic ring or small graphene sheet can readily react with the lithium ions; (B) Examples of functional groups capable of reversibly reacting with lithium ions. Lithium ions are not required to enter the interior of a solid particle (no solid state diffusion is necessary), as opposed to a conventional lithium ion battery wherein lithium ions must diffuse through a narrow channel of a solid compound (e.g., a $LiFePO_4$ particle); and (C) A possible lithium storage mechanism, which is fast, reversible, and stable.

The disordered carbon material may be selected from a broad array of carbonaceous materials, such as a soft carbon, hard carbon, polymeric carbon (or carbonized resin), meso-phase carbon, coke, carbonized pitch, carbon black, activated carbon, or partially graphitized carbon. As schematically illustrated in FIGS. 2(A) and (B), a disordered carbon material is typically formed of two phases wherein a first phase is small graphite crystal(s) or small stack(s) of graphite planes (with typically up to 10 graphite planes or aromatic ring structures overlapped together to form a small ordered domain) and a second phase is non-crystalline carbon, and wherein the first phase is dispersed in the second phase or bonded by the second phase. The second phase is made up of mostly smaller molecules, smaller aromatic rings, defects, and amorphous carbon. The desired functional groups (e.g., —COOH and $NH_2$ groups in FIG. 2(B)) are attached to an edge or plane surface of a aromatic ring structure. Typically, the disordered carbon is highly porous (e.g., activated carbon) or present in an ultra-fine powder form (e.g. carbon black) having nano-scaled features (hence, a high specific surface area).

Figure 3A:
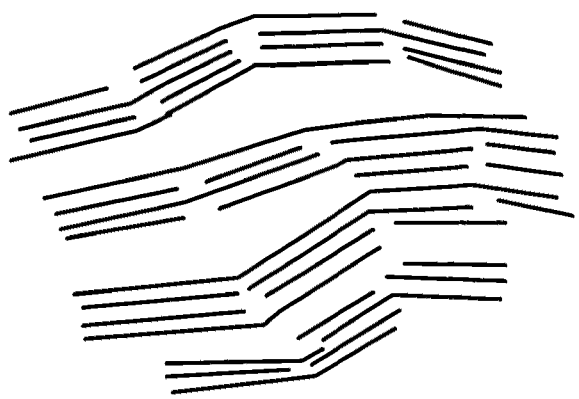
FIG. 3 (A) Schematic of a soft carbon, wherein neighboring stacks of graphene sheets or small aromatic rings are favorably oriented with respect to each other at a small angle that is conducive to the growth or merging (graphitizable); (B) hard carbon (non-graphitizable); (C) carbon black, having a large number of small aromatic ring domains arranged to form a nano-scaled spherical particle. Preferably, an individual carbon black particle is activated to open up small gates that enable liquid electrolyte to access the edge- or surface-borne functional groups inside a particle, as illustrated in (D).

Soft carbon refers to a carbonaceous material composed of small graphite crystals wherein the orientations of these graphite crystals or stacks of graphene sheets are conducive to further merging of neighboring graphene sheets or further growth of these graphite crystals or graphene stacks (FIG. 3(A)) using a high-temperature heat treatment (graphitization). Hence, soft carbon is said to be graphitizable.

Figure 3B:
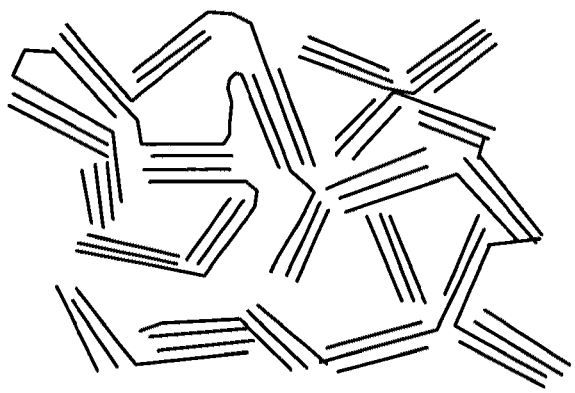

Hard carbon (FIG. 3(B)) refers to a carbonaceous material composed of small graphite crystals wherein these graphite crystals or stacks of graphene sheets are not oriented in a favorable directions (e.g. nearly perpendicular to each other) and, hence, are not conducive to further merging of neighboring graphene sheets or further growth of these graphite crystals or graphene stacks (i.e., not graphitizable).

Figure 3C:
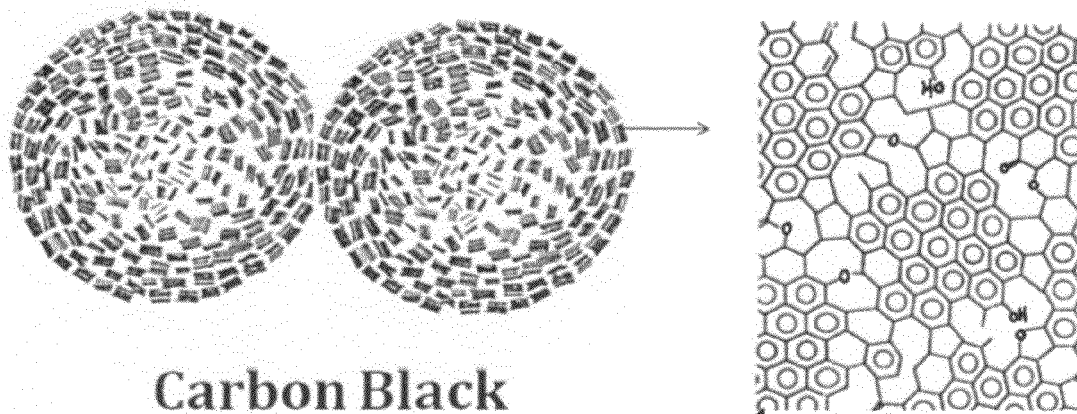
Figure 3D:
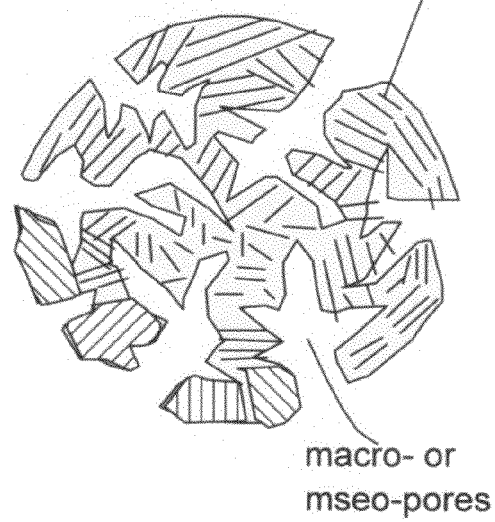

As schematically illustrated in FIG. 3(C), Carbon black (CB), acetylene black (AB), and activated carbon (AC) are typically composed of domains of aromatic rings or small graphene sheets, wherein aromatic rings or graphene sheets in adjoining domains are somehow connected through some chemical bonds in the disordered phase (matrix). These carbon materials are commonly obtained from thermal decomposition (heat treatment, pyrolyzation, or burning) of hydrocarbon gases or liquids, or natural products (wood, coconut shells, etc).

The preparation of polymeric carbons by simple pyrolysis of polymers or petroleum/coal tar pitch materials has been known for approximately three decades. When polymers such as polyacrylonitrile (PAN), rayon, cellulose and phenol formaldehyde were heated above 300° C. in an inert atmosphere they gradually lost most of their non-carbon contents. The resulting structure is generally referred to as a polymeric carbon. Depending upon the heat treatment temperature (HTT) and time, polymeric carbons can be made to be insulating, semi-conducting, or conducting with the electric conductivity range covering approximately 12 orders of magnitude. This wide scope of conductivity values can be further extended by doping the polymeric carbon with electron donors or acceptors. These characteristics uniquely qualify polymeric carbons as a novel, easy-to-process class of electro-active materials whose structures and physical properties can be readily tailor-made.

Polymeric carbons can assume an essentially amorphous structure, or have multiple graphite crystals or stacks of graphene planes dispersed in an amorphous carbon matrix. Depending upon the HTT used, various proportions and sizes of graphite crystals and defects are dispersed in an amorphous matrix. Various amounts of two-dimensional condensed aromatic rings or hexagons (precursors to graphene planes) can be found inside the microstructure of a heat treated polymer such as a PAN fiber. An appreciable amount of small-sized graphene sheets are believed to exist in PAN-based polymeric carbons treated at 300-1,000° C. These species condense into wider aromatic ring structures (larger-sized graphene sheets) and thicker plates (more graphene sheets stacked together) with a higher HTT or longer heat treatment time (e.g., >1,500° C.). These graphene platelets or stacks of graphene sheets (basal planes) are dispersed in a non-crystalline carbon matrix. Such a two-phase structure is a characteristic of some disordered carbon material.

There are several classes of precursor materials to the disordered carbon materials of the instant patent application. For instance, the first class includes semi-crystalline PAN in a fiber form. As compared to phenolic resin, the pyrolized PAN fiber has a higher tendency to develop small crystallites that are dispersed in a disordered matrix. The second class, represented by phenol formaldehyde, is a more isotropic, essentially amorphous and highly cross-linked polymer. The third class includes petroleum and coal tar pitch materials in bulk or fiber forms. The precursor material composition, heat treatment temperature (HTT), and heat treatment time (Htt) are three parameters that govern the length, width, thickness (number of graphene planes in a graphite crystal), and chemical composition of the resulting disordered carbon materials.

In the present investigation, PAN fibers were subjected to oxidation at 200-350° C. while under a tension, and then partial or complete carbonization at 350-1,500° C. to obtain polymeric carbons with various nano-crystalline graphite structures (graphite crystallites). Selected samples of these polymeric carbons were further heat-treated at a temperature in the range of 1,500-2,000° C. to partially graphitize the materials, but still retaining a desired amount of amorphous carbon (no less than 10%). Phenol formaldehyde resin and petroleum and coal tar pitch materials were subjected to similar heat treatments in a temperature range of 500 to 1,500° C. The disordered carbon materials obtained from PAN fibers or phenolic resins are preferably subjected to activation using a process commonly used to produce activated carbon (e.g., treated in a KOH melt at 900° C. for 1-5 hours). This activation treatment is intended for making the disordered carbon meso-porous, enabling chemical functionalizing agents to reach the edges or surfaces of the constituent aromatic rings. The meso-pores will also be accessible to the liquid electrolyte after the battery cell is made. Such an arrangement enables the lithium ions in the liquid to readily react with the functional groups without having to undergo solid-state diffusion.

Figure 4:
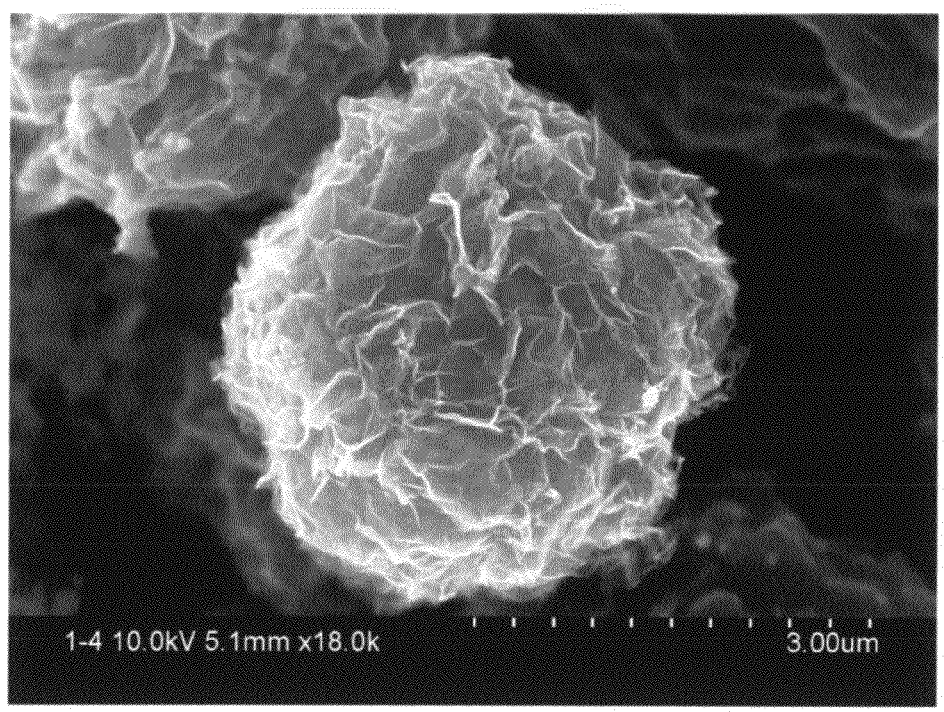
FIG. 4 An SEM image of select meso-phase carbon particles.

Certain grades of petroleum pitch or coal tar pitch may be heat-treated (typically at 250-500° C.) to obtain a liquid crystal-type, optically anisotropic structure commonly referred to as meso-phase. This meso-phase material can be extracted out of the liquid component of the mixture to produce meso-phase particles or spheres (e.g. FIG. 4).

The functionalized disordered carbon may be produced by using the following recommended procedures (as a preferred embodiment):

(a) Physically or chemically activating a desired disordered carbon (e.g. a soft carbon, hard carbon, polymeric carbon or carbonized resin, meso-phase carbon, coke, carbonized pitch, carbon black, activated carbon, or partially graphitized carbon) to obtain activated disordered carbon. For instance, the activation treatment can be accomplished through oxidizing, $CO_2$ physical activation, KOH or NaOH chemical activation, or exposure to nitric acid, fluorine, or ammonia plasma.

(b) dispersing the activated disordered carbon to a liquid medium containing a functionalizing agent (e.g., an oxidizing agent such as sulfuric acid, nitric acid, hydrogen peroxide or, preferably, carboxylic acid, formic acid, etc., which is a source of —COOH group) to form a suspension. Stirring, mechanical shearing, or ultrasonication, and/or temperature can be used to break up the activated disordered carbon particles to accelerate the functionalization of disordered carbon. The functionalizing agent may be an amine- (or —$NH_2$-containing group, as used in several common curing agents for epoxy resins), carboxylic groups (—COOH), or other groups capable of reversibly reacting with lithium; and, optionally, (c) aerosolizing the suspension into liquid droplets containing chemically functionalized disordered carbon particles while concurrently removing the liquid to recover functionalized disordered carbon particles.

The carboxylic acids, being environmentally benign, are particularly preferred functionalizing agents for imparting carbonyl or carboxylic groups to disordered carbon. The carboxylic acid may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. Preferably, the carboxylic acid is selected from the group consisting of saturated aliphatic carboxylic acids of the formula $H(CH_2)_n COOH$, wherein n is a number of from 0 to 5, including formic, acetic, propionic, butyric, pentanoic, and hexanoic acids, anydrides thereof, reactive carboxylic acid derivatives thereof, and combinations thereof. The most preferred carboxylic acids are formic acid and acetic acid.

The disordered carbon material used in the aforementioned electrode may be subjected to the following treatments, separately or in combination, before or after the functionalization operation:

(i) chemically functionalizing with a different functional group. Other useful surface functional groups may include quinone, hydroquinone, quaternized aromatic amines, or mercaptans;

(ii) coating or grafting with a polymer that contains a desired functional group (e.g., carbonyl group);

(iii) subjecting to additional activation treatment (analogous to activation of carbon black materials or oxidation) to create additional surfaces and possibly imparting functional chemical groups to these surfaces.

Specifically, the oxidation treatment comprises subjecting the disordered carbon material to an oxidizing agent preferably selected from ozone, sulfonic ($SO_3$) vapor, an oxygen-containing gas, hydrogen peroxide vapor, nitric acid vapor, or a combination thereof. Preferably, the treatment comprises subjecting the carbon material to an oxidizing agent in a hydrogen-containing environment. Although oxidation treatment can be conducted by immersing carbon in a liquid acid and/or oxidizer environment, such a procedure requires a subsequent water-rinsing and purification step. Hence, a gaseous treatment requiring no post-treatment rinsing is preferred.

A primary goal of the oxidation treatment is to impart a desired amount of functional groups to a disordered carbon material without significantly compromising its electrical conductivity. After an extensive and in-depth study we have come to discover that conductive, functionalized carbon can be produced with an oxygen content preferably no greater than 35% by weight, preferably between 15% and 25% by weight. Presumably, a majority of the functional groups are located at the edges of the aromatic rings since the electrical conductivity would not be significantly reduced. Beyond 25% of the over-all oxygen content, functional groups begin to appear on graphene or aromatic ring plane surfaces, interrupting electron-conducting paths. The oxygen contents were determined using chemical elemental analysis and X-ray photoelectron spectroscopy (XPS).

The partially oxidized disordered carbon prepared according to a preferred embodiment of the present invention can be further functionalized by carrying out an additional step of contacting the partially oxidized carbon with a reactant so that a functional group is added to a surface or edge of an aromatic ring (e.g., as shown in FIG. 2(B)). The functional group may contain alkyl or aryl silane, alkyl or aralkyl group, hydroxyl group, amine group, fluorocarbon, or a combination thereof.

The disordered carbons, after a partial oxidation treatment, will have a reactive carbon surface (RCS) or reactive carbon edge (RCE). They can be prescribed to undergo the following reactions:
(a) RCS/RCE+CH$_2$══CHCOX (at 1,000° C.)→Disordered Carbon-R'COH (where X═—OH, —Cl, or —NH$_2$); e.g., RCS/RCE+CH$_2$══CHCOOH→DC—R'CO—OH (where DC=small carbon hexagon or aromatic ring);
(b) RCS/RCE+Maleic anhydride→DC—R'(COOH)$_2$;
(c) RCS/RCE+CH$_2$══CH—CH$_2$X→DC—R'CH$_2$X (where X═—OH, -halogen, or —NH$_2$);
(d) RCS/RCE+H$_2$O→DC══O (Quinoidal);
(e) RCS/RCE+CH$_2$══CHCHO→DC—R'CHO (Aldehydic);

In the above-listed reactions, R' is a hydrocarbon radical (alkyl, cycloalkyl, etc). Partial oxidation of disordered carbon can lead to the attachment of some functional groups on a surface or at an edge of a graphene plane or aromatic ring structure, including carboxylic acid and hydroxyl groups. A large number of derivatives can be prepared from carboxylic acid alone. For instance, alcohols or amines can be easily linked to acid to provide stable esters or amides.

Any reaction capable of attaching carbonyl (>C═O) or amine (—NH$_2$) group to the graphene edge or basal plane surface of a disordered carbon material may be used for practicing the instant invention. The following examples serve to illustrate the preferred embodiments of the present invention and should not be construed as limiting the scope of the invention:

Example 1

Functionalized Soft Carbon

Functionalized soft carbon was prepared from a liquid crystalline aromatic resin. The resin was ground with a mortar, and calcined at 900° C. for 2 h in a N$_2$ atmosphere to prepare the graphitizable carbon or soft carbon. The resulting soft carbon was mixed with small tablets of KOH (four-fold weight) in an alumina melting pot. Subsequently, the soft carbon containing KOH was heated at 750° C. for 2 h in N$_2$. Upon cooling, the alkali-rich residual carbon was washed with hot water until the outlet water reached a pH value of 7. The activated soft carbon was then immersed in a 90% H$_2$O$_2$-10% H$_2$O solution at 45° C. for an oxidation treatment that lasted for 2 hours. Then, the resulting partially oxidized soft carbon was immersed in HCOOH at room temperature for functionalization for 24 hours. The resulting functionalized soft carbon was dried by heating at 60° C. in a vacuum for 24 hours.

Coin cells using functionalized soft carbon as the cathode and a thin piece of lithium foil or lithium titanate as an anode were made and tested. These cells presumably work on the redox reactions of lithium ions with select functional groups on the surfaces/edges of aromatic rings. These functional groups, attached to both the edge and plane surfaces of aromatic rings (small graphene sheets), are capable of rapidly and reversibly react with lithium. This revolutionary new energy storage device fundamentally differs from a supercapacitor since an electric double layer (EDL) supercapacitor relies on the formation of EDL charges at the electrode-electrolyte interface. This device also differs from conventional lithium ion batteries where lithium intercalates into inter-graphene spaces in a graphite particle of an anode (FIG. 1(D)) or where both the anode and cathodes are based on lithium intercalation compounds (e.g. FIG. 1(E)). In the presently invented lithium super-battery, functionalized disordered carbon (f-DC) is used at the cathode and lithium metal (FIG. 1(A)), lithium titanate (as an example, FIG. 1(C)), or lithium cobalt oxide or lithium iron phosphate (which is used as a cathode active material in the conventional lithium ion battery) is used at the anode (FIG. 1(C)).

Electrochemical measurements were conducted using a two-electrode electrochemical cell or coin cell consisting of an f-DC electrode, one sheet of micro-porous membrane (Celgard 2500) and lithium foil as the counter-electrode. In another case, lithiated lithium titanate (LTO or Li$_4$Ti$_5$O$_{12}$) was used as the negative electrode. A piece of carbon-coated aluminum foil (25 mm thick) in contact with an electrode was used as a current collector. The electrolyte solution was 1 M LiPF$_6$ dissolved in a mixture of ethylene carbonate (EC) and dimethyl carbonate (DMC) with a 3:7 volume ratio. The separator was wetted by a minimum amount of electrolyte to reduce the background current. Cyclic voltammetry and galvanostatic measurements of the lithium cells were conducted using an Arbin 32-channel supercapacitor-battery tester at room temperature (in some cases, at a temperature as low as −40° C. and as high as 60° C.).

Figure 5A:
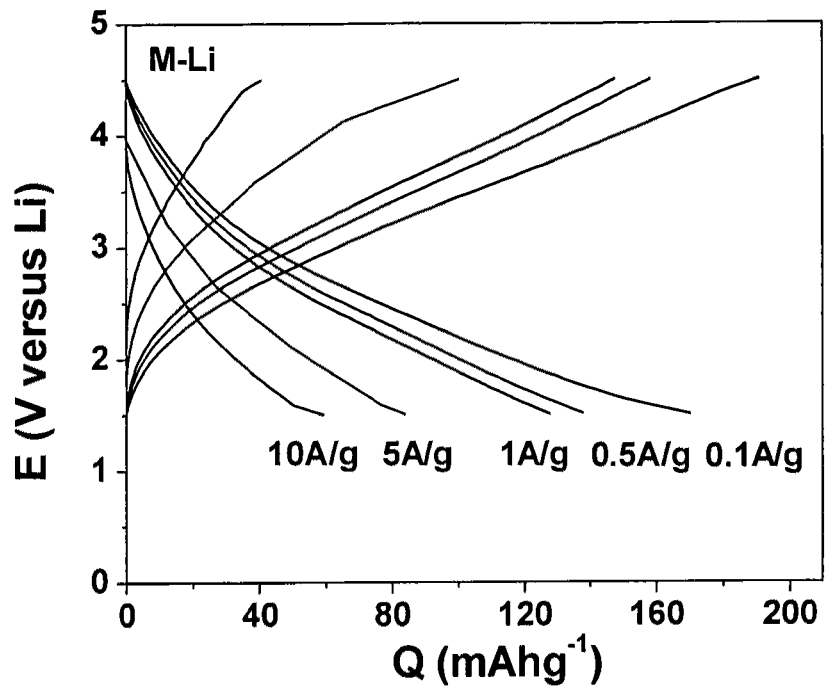
FIG. 5 (A) Galvanostatic charge-discharge curves of a super-battery with a functionalized soft carbon-based bulk material (thickness >200 μm) as a cathode active material (data acquired at several different current densities); (B) cyclic voltammograms of a lithium super-battery formed of a Li metal anode and a functionalized disordered carbon cathode at three different scan rates.

Galvanostatic studies (FIG. 5(A)) of the super-battery with such a functionalized soft carbon-based bulk material (thickness >200 μm) as a cathode active material have shown that a composite composed of 85 wt. % functionalized soft carbon (+5% Super-P and 10% PTFE binder coated on Al foil) provides the cell with a specific capacity of 127 mAh/g at the 1 A/g current density. The energy density of this cell is over 400 Wh/kg at the 0.1 A/g current density. The energy density maintains a value of over 100 Wh/kg even at a high current density of 10 A/g.

Further calculations from the obtained data indicate that the discharge time is 19 s at the current density of 10 A/g. For current densities of 0.5 A/g, 1 A/g, 2 A/g, 5 A/g, and 10 A/g imposed on this cell, the corresponding power densities are 1,276 W/kg, 2,531 W/kg, 5,014 W/kg, 12,151 W/kg, and 23,002 W/kg, respectively. As mentioned earlier in the Background section, the power density of a state-of-the-art supercapacitor is typically of 5,000-10,000 W/Kg, but that of a lithium-ion battery is 100-500 W/kg. This implies that the presently invented lithium super-battery has an energy density comparable to that of a modern battery and a power density (or charge-discharge rates) comparable to or higher than those of conventional electrochemical supercapacitors.

Figure 2C:
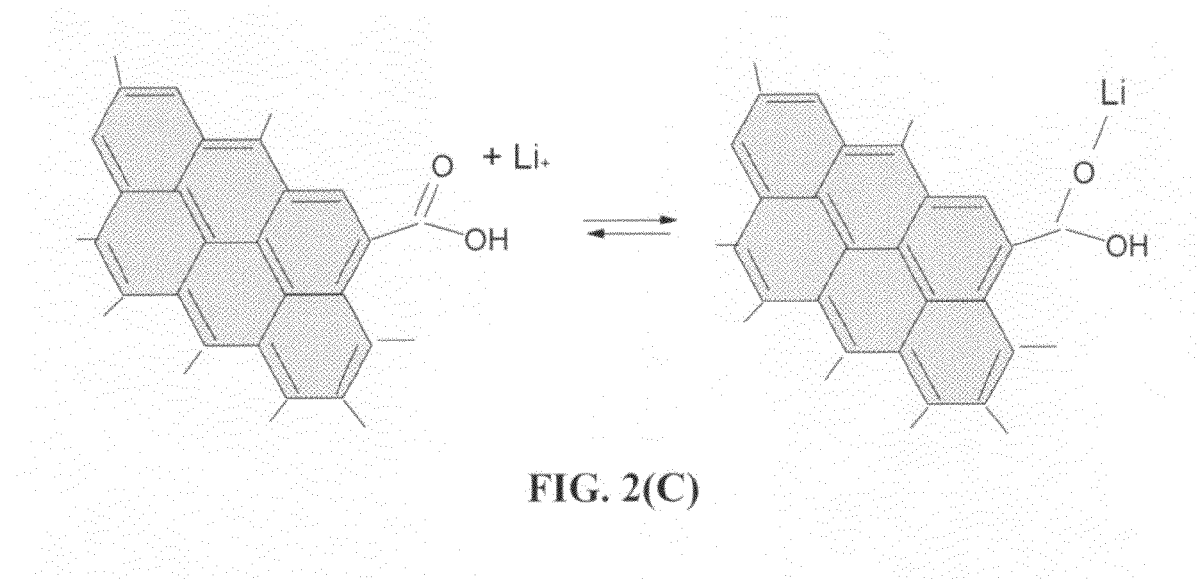
Figure 5B:
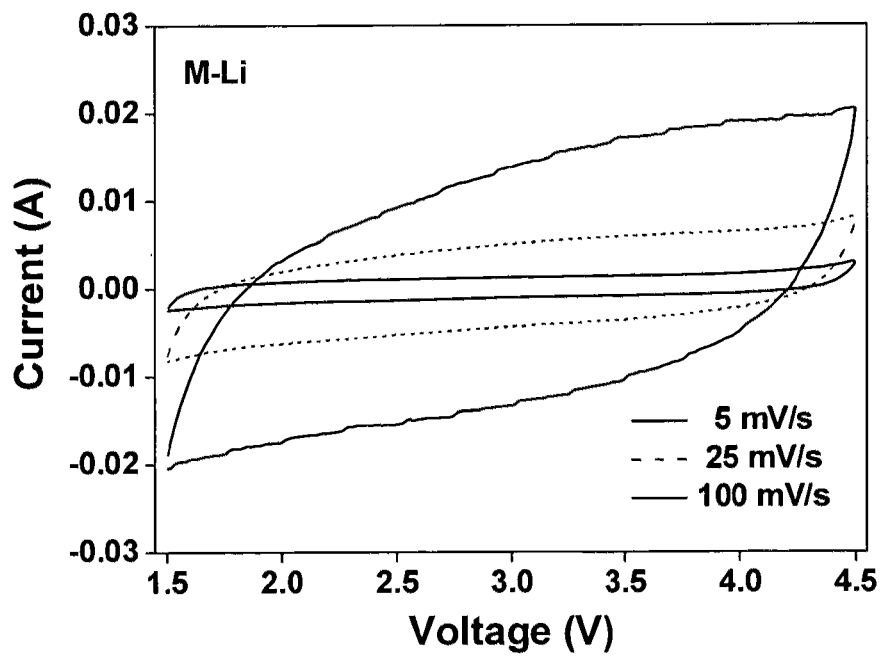

The CV curves shown in FIG. 5(B) clearly indicate a redox-type chemical reaction between the functionalized disordered carbon and lithium ions in the electrolyte. Not wishing to be bound by the theory, but we hypothesize that functional groups, such as —COOH, =O, and —$NH_2$, can reversibly capture a lithium ion, e.g., according to the mechanism illustrated in FIG. 2(C). Our extensive research has indicated that disordered carbon, after activation and oxidation, typically has several types of oxygen-containing groups attached to the edge or top/bottom surface of a small graphene sheet or aromatic ring.

Figure 6:
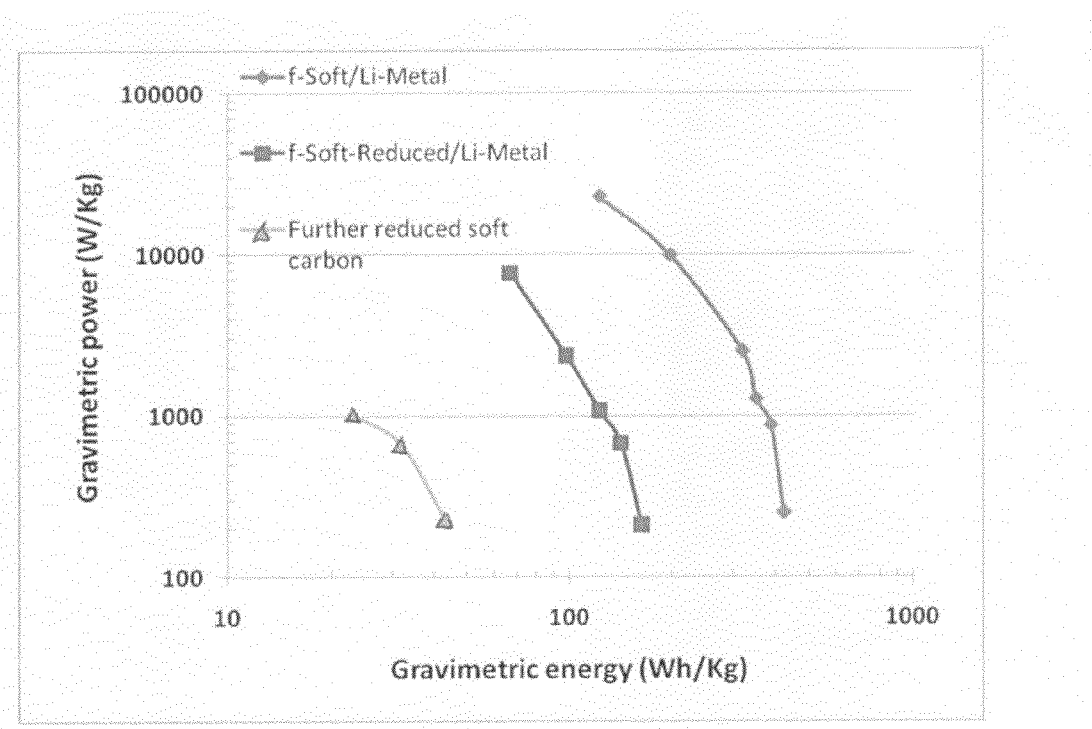
FIG. 6. Ragone plot of a functionalized disordered carbon-based lithium super-battery (O content in the cathode active material >27% by weight), that of its thermally reduced counterpart (O content <12% by weight), and that of further reduced sample (O content <2% by weight).

The role of surface functional groups in providing high capacity to the soft carbon cathode was confirmed by comparing the specific capacity of the carbon material before and after exposure to a reducing agent of 4% $H_2$ and 96% $N_2$ by volume at 900° C. for 1 h and 3 h, respectively. The gravimetric current and capacitance values of the graphene electrode decreased considerably after this thermal reduction treatment to reduce the amount of functional groups, resulting in a significantly reduced energy and power densities, as shown in FIG. 6 (second curve in the diagram). A further deduction of the oxygen content (hence functional group content) to below 2-3 weight % oxygen in the soft carbon has essentially eliminated most of the lithium storage capacity of the cell (far left curve in FIG. 6). A comparison of the energy density and power density data in the Ragone plot of FIG. 6 has clearly shown that the reduction in oxygen content (hence, the functional group content) led to a proportional reduction in the lithium storage capability. This observation further confirms the proposed lithium storage mechanism via the redox reaction between a Li ion and an oxygen-bearing functional group. This reduction in the amount of surface/edge oxygen on the aromatic ring or graphene sheets in soft carbon was demonstrated by the element analysis studies using both the Fourier transform infrared spectroscopy and Raman spectroscopy.

Example 2

Functionalized Activated Carbon

Activated carbon (AC, from Ashbury Carbon Co.) was treated with an acid solution (sulfuric acid, nitric acid, and potassium permanganate at a ratio of 4:1:0.05) for 24 hours. Upon completion of the reaction, the mixture was poured into deionized water and filtered. The treated AC was repeatedly washed in a 5% solution of HCl to remove most of the sulphate ions. The sample was then washed repeatedly with deionized water until the pH of the filtrate was neutral. The slurry was subjected to further functionalization in formic acid at 25° C. for 30 minutes in an ultrasonication bath. Subsequently, dip-coating was used to obtain thin films of chemically functionalized activated carbon (f-AC) with a thickness of typically between 20 and 150 μm coated on a surface of an aluminized carbon layer as a current collector. In one case, the f-AC film was used as a cathode and a lithium foil was used as an anode. In another case, lithiated lithium titanate (LTO or $Li_4Ti_5O_{12}$) was used as the negative electrode active material.

Figure 7:
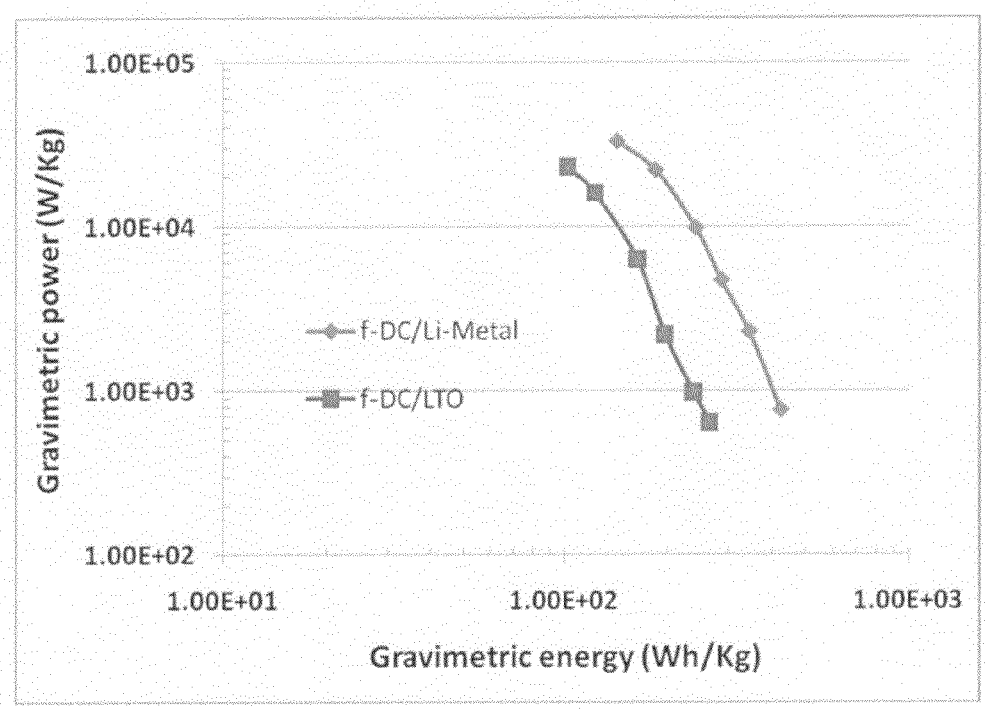
FIG. 7. Ragone plot of a functionalized activated carbon/Li metal and activated carbon/Li titanate super-batteries.
Figure 8:
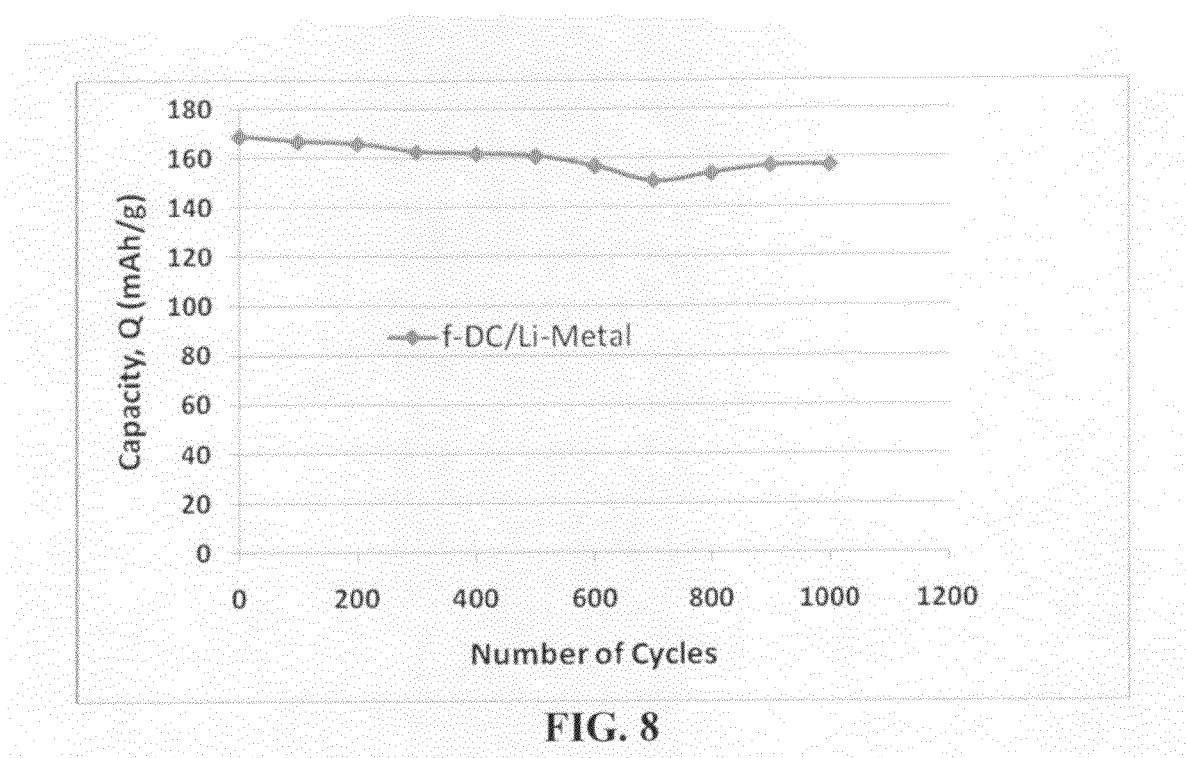
FIG. 8 The capacity decay values plotted as a function of the number of charge-discharge cycles for a super-battery with a functionalized soft carbon-based bulk material (thickness >200 μm) used as a cathode active material.

Electrochemical testing was conducted using the same procedures described in Example 1. The Ragone plot shown in FIG. 7 indicates that the energy densities of a lithium super-battery featuring chemically functionalized AC as a cathode active material (54 μm thick) and LTO as an anode active material are lower than those of its counterpart with a lithium foil as the anode active material.

Example 3

Needle Coke

Anisotropic needle coke produced in a commercial delayed coker was provided from Nippon Steel Chemical Co. Ltd. The anisotropic coke had a fully developed needle-shape texture of optical anisotropy. Volatile species of the raw coke was estimated to be around 5 wt. %. Activation was carried out using KOH. The reaction apparatus consisted of a stainless tube and a nickel sample holder. KOH activation was carried out at 800° C. for 2 h under Ar flow, and coke/KOH ratio was varied between 1/1 and 1/4. The activated needle coke was then immersed in a $H_2SO_4$—$NaNO_3$ mixture at 45° C. for an oxidation and functionalization treatment that lasted for 24 hours. The highest energy densities of a lithium super-battery featuring chemically functionalized needle coke a cathode active material (124 μm thick) and lithium foil as an anode active material was found to be approximately 321 Wh/kg. The highest power density was 24 Kw/Kg.

Example 4

Petroleum Pitch-Derived Hard Carbon

A pitch sample (A-500 from Ashland Chemical Co.) was carbonized in 900° C. for 2 hours, followed by carbonization at 1,200° C. for 4 hours. KOH activation was carried out at 800° C. for 2 h under Ar flow to open up the internal structure of pitch-based hard carbon particles. The activated pitch-derived carbon was then immersed in a mixture of sulfuric acid, sodium nitrate, and potassium permanganate at a ratio of 4:1:0.05 at 32° C. for an oxidation and functionalization treatment that lasted for 24 hours. The highest energy densities of a lithium super-battery featuring chemically functionalized needle coke as a cathode active material (124 μm thick) and lithium foil as an anode active material was found to be approximately 316 Wh/kg. The highest power density was 25 Kw/Kg.

Example 5

Meso-Phase Carbon

Optically anisotropic spherical carbon (average particle size: 25 μm, quinoline soluble: 5%) prepared from coal-based isotropic pitch was activated with $K_2CO_3$ at 900° C. for 1 h. The obtained activated meso-phase carbons showed a BET specific surface area of 2,300 $m^2$/g. The activated meso-phase carbon was then immersed in a mixture of sulfuric acid, sodium nitrate, and potassium permanganate at a ratio of 4:1:0.05 at 32° C. for an oxidation and functionalization treatment that lasted for 24 hours. The highest energy densities of a lithium super-battery featuring chemically functionalized needle coke as a cathode active material (113 μm thick) and lithium foil as an anode active material was found to be approximately 413 Wh/kg. The highest power density was 26 Kw/Kg.

In conclusion, the instant invention provides a revolutionary energy storage device that has the best features of both the supercapacitor and the lithium ion battery. The device can deliver a power density higher than that of the best supercapacitor by a factor of 2-10 while also maintaining an energy density higher than that of the best supercapacitor by a factor of 6. A presently invented lithium super-battery using the functionalized disordered carbon electrode as the positive electrode and lithium titanium oxide ($Li_4Ti_5O_{12}$) as a negative electrode has a gravimetric energy ~5-10 times higher than that of conventional supercapacitors and a power density ~10-30 times higher than that of conventional lithium-ion batteries. This is truly a breakthrough technology.

Theory (Lithium Ion Diffusion Kinetics of Super-Batteries)

Not wishing to be constrained by any theory, but we would like to offer the following theoretical considerations that perhaps are helpful to the readers. We will provide some insight as to how this type of battery operates and why such a lithium battery also behaves like a supercapacitor, exhibiting power densities that are comparable or superior to those of conventional supercapacitors. We will shed some light on why the electrode thickness of a lithium super-battery plays such a critical role in dictating the power density in such a dramatic manner.

The internal structure of a conventional lithium-ion battery may be schematically shown in FIG. 9(A) below. In a battery discharge situation, lithium ions must diffuse out of an anode active material particle (diameter=$d_a$ and the average diffusion distance=$d_a/2$) and then diffuse across the anode thickness (anode layer thickness=La and the average diffusion distance=La/2). Subsequently, lithium ions must move across a porous separator (thickness=Lc), diffuse across part of the cathode thickness (thickness=Lc) to reach a particular cathode active material particle (average diffusion distance=Lc/2), and then diffuse into the particle (diameter=$d_c$ and the average diffusion distance required=$d_c/2$). In a re-charge situation, the lithium ions move in the opposite direction, but must travel approximately the same distances.

Assume that the diffusion coefficient of Li ions in a particular medium is D and a required travel distance is x, then the required diffusion time will be $t \sim x^2/D$, according to a well-known kinetics equation. As a first-order of approximation, the total required time scale for a lithium ion to complete a charge or discharge process may be given as:

$$t_{total} = (La/2)^2/D_{electrolyte} + (d_a/2)^2/D_a(Lc)2/D_s + (Lc/2)^2/D_{electrolyte} + (d_c/2)^2/D_c \quad (1)$$

where $D_{electrolyte}$=Li ion diffusion coefficient in electrolyte, $D_a$=Li ion diffusion coefficient in an anode active material particle, $D_s$=Li ion diffusion coefficient through a porous separator, and $D_c$=Li ion diffusion coefficient in a cathode active material particle.

Representative diffusion coefficients of $Li^+$ in or through various liquid mediums or solid membrane or particles are given below (based on open literature data): liquid electrolyte ($2\times10^{-6}$ cm$^2$/s); separator ($7.5\times10^{-7}$ cm$^2$/s); $LiFePO_4$ cathode ($10^{-13}$ cm$^2$/s); $Li_3V_2(PO_4)_3$ cathode ($10^{-13}$ to $10^9$ cm$^2$/s); nano-Si anode ($10^{-12}$ cm$^2$/s); graphite anode ($1-4\times10^{-10}$ cm$^2$/s); and $Li_4Ti_5O_{12}$ anode ($1.3\times10^{11}$ cm$^2$/s). This implies that, for a conventional lithium ion battery cell wherein $LiFePO_4$ particles are used as a cathode active material, the final term, $(d_c/2)^2/D_c$, in Eq. (1) dominates the required total diffusion time due to its excessively low diffusion coefficient. Actually, the value of diffusion coefficient varies between $10^{-10}$ and $10^{-16}$ cm$^2$/s, depending on the lithium content in solid solution $Li_xFePO_4$ and $Li_{1-x}FePO_4$ (X<0.02) or the $LiFePO_4/FePO_4$ phase ratio.

Figure 9:
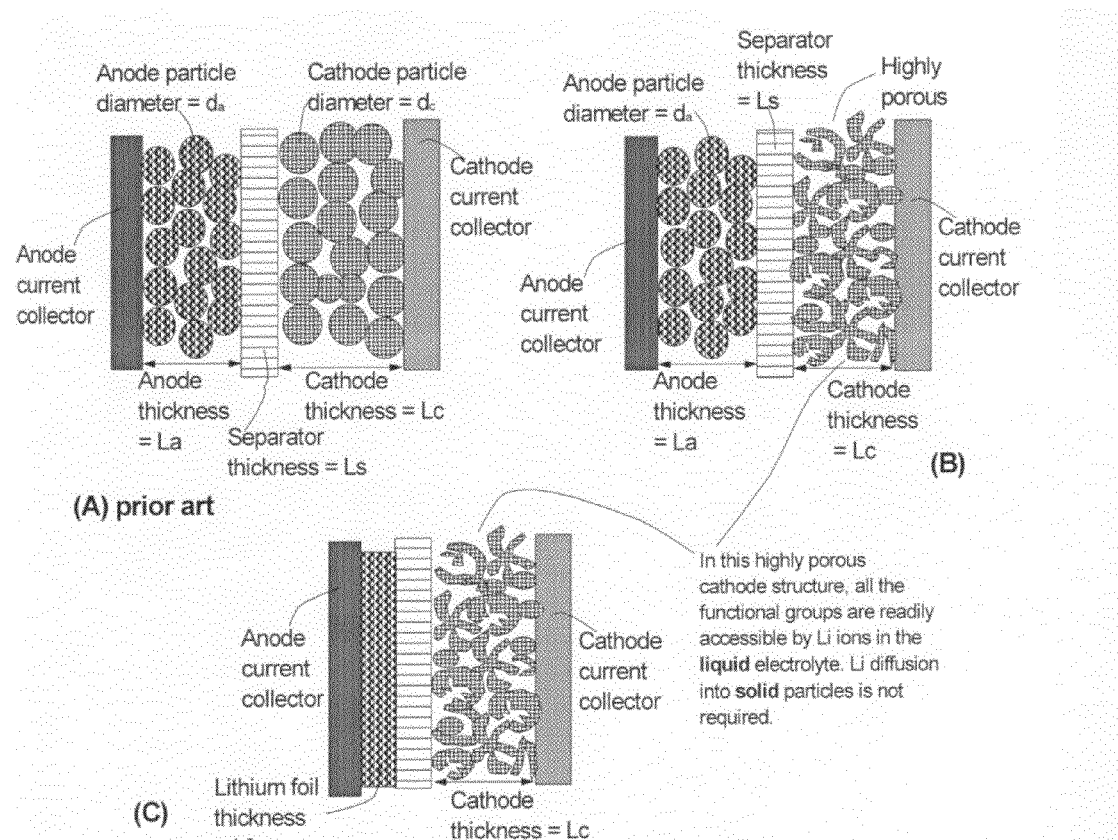
FIG. 9 (A) Schematic of the internal structure of a conventional lithium-ion battery; (B) that of a presently invented super-battery; and (C) that of another presently invented super-battery.

In contrast, in a super-battery containing a meso-porous cathode of functionalized nano carbon material (schematically illustrated in FIGS. 9(B) and 9(C)), Li ions do not have to diffuse through a solid-state cathode particle and, hence, are not subject to the limitation by a low solid-state diffusion coefficient (e.g. $10^{-13}$ cm$^2$/s in a $LiFePO_4$ particle). Instead, the cathode active materials are highly porous, having liquid electrolyte reaching the interior of the pores where the functional groups are present to readily and reversibly react with lithium ions that diffuse into these pores through a liquid medium (not a solid medium) with a high diffusion coefficient (e.g., $2\times10^{-6}$ cm$^2$/s). In such a super-battery, the final term, $(d_c/2)^2/D_c$, in Eq. (1) is practically non-existing. The required total diffusion time is now dictated by the thicknesses of the electrodes and the separator. The above discussion is based on the premise that the reversible reaction between a functional group and a lithium ion in the electrolyte is fast, and the whole charge-discharge process is not reaction-controlled. By plugging representative values of the various parameters in Eq. (1) we obtain the total lithium diffusion time required of a battery charge or discharge process for several conventional lithium-ion battery types and several lithium super-battery cells of the present invention. These data are shown in Table 1(a) and (b) below:

TABLE 1(a)

Parameters used in the present calculations (CNM = carbon nano materials, including carbon nanotubes (CNTs), nano graphene platelets (NGPs), disordered carbon, etc; Gr = graphite).

| Cell Type (Anode/Cathode) | $D_{li}$ in Electrolyte cm$^2$/s | La (um) | Anode particle Dia., da (um) | $D_{li}$ in anode particle cm$^2$/s | Sep. thick. (um) | $D_{li}$ in separator cm$^2$/s | Lc (um) | Cathode particle Dia., dc (um) | $D_{li}$ in cathode particle cm$^2$/s | Total diffusion time (sec) |
|---|---|---|---|---|---|---|---|---|---|---|
| Gr/LiFePO$_4$ | 1.00E-06 | 200 | 20 | 2.00E-10 | 100 | 7.50E-07 | 200 | 1 | 1.0E-13 | 3.02E+04 |
| Gr/LiFePO$_4$-nano | 1.00E-06 | 200 | 20 | 2.00E-10 | 100 | 7.50E-07 | 200 | 0.1 | 1.0E-13 | 5.48E+03 |
| Gr/LiFePO$_4$-nano | 1.00E-06 | 200 | 1 | 2.00E-10 | 100 | 7.50E-07 | 200 | 0.1 | 1.0E-13 | 4.96E+02 |
| Nano-Si/LiFePO$_4$ | 1.00E-06 | 200 | 0.1 | 1.00E-12 | 100 | 7.50E-07 | 200 | 0.1 | 1.0E-13 | 5.08E+02 |
| Li$_4$Ti$_5$O$_{12}$/LiFePO$_4$ | 1.00E-06 | 200 | 0.1 | 1.30E-11 | 100 | 7.50E-07 | 200 | 0.1 | 1.0E-13 | 4.85E+02 |
| Li$_4$Ti$_5$O$_{12}$/LiFePO$_4$ | 1.00E-06 | 100 | 0.05 | 1.30E-11 | 50 | 7.50E-07 | 100 | 0.05 | 1.0E-13 | 1.21E+02 |
| Li$_4$Ti$_5$O$_{12}$/f-CNM | 1.00E-06 | 200 | 0.1 | 1.30E-11 | 100 | 7.50E-07 | 200 | 0.1 | 1.0E-6 | 2.35E+02 |
| Li$_4$Ti$_5$O$_{12}$/f-CNM | 1.00E-06 | 20 | 0.1 | 1.30E-11 | 20 | 7.50E-07 | 20 | 0.1 | 1.0E-6 | 5.26E+00 |
| Li$_4$Ti$_5$O$_{12}$/f-CNM | 1.00E-06 | 2 | 0.1 | 1.30E-11 | 2 | 7.50E-07 | 2 | 0.1 | 1.0E-6 | 1.96E+00 |
| Li$_4$Ti$_5$O$_{12}$/f-CNM | 1.00E-06 | 2 | 0.1 | 1.30E-11 | 2 | 1.00E-06 | 0.2 | 0.1 | 1.0E-6 | 1.94E+00 |
| Li foil/f-CNM | 1.00E-06 | 10 | 0 | 1.30E-11 | 10 | 7.50E-07 | 0.3 | 0.1 | 1.0E-6 | 5.84E-01 |
| Li foil/f-CNM | 1.00E-06 | 10 | 0 | 1.30E-11 | 10 | 7.50E-07 | 3 | 0.1 | 1.0E-6 | 6.06E-01 |
| Li foil/f-CNM | 1.00E-06 | 30 | 0 | 1.30E-11 | 10 | 7.50E-07 | 30 | 0.1 | 1.0E-6 | 4.83E+00 |
| Li foil/f-CNM | 1.00E-06 | 30 | 0 | 1.30E-11 | 10 | 7.50E-07 | 200 | 0.1 | 1.0E-6 | 1.03E+02 |

TABLE 1(b)

The required diffusion time to reach a particle in the anode ($t_{La}$), diffusion in the anode particle (ta), diffusion time through the separator (ts), diffusion time to reach a cathode particle ($t_{Lc}$), and the diffusion time in the cathode particle (tc).

| $t_{La}$ (sec) | Ta (sec) | ts (sec) | $t_{Lc}$ (sec) | tc (sec) | Total time (sec) | Total time (hours) | Cell type |
|---|---|---|---|---|---|---|---|
| 1.00E+02 | 5.00E+03 | 3.33E+01 | 1.00E+02 | 1.39E+05 | 3.02E+04 | 8.40 | Gr/LiFePO$_4$ |
| 1.00E+02 | 5.00E+03 | 3.33E+01 | 1.00E+02 | 1.39E+03 | 5.48E+03 | 1.52 | Gr/LiFePO$_4$-nano |
| 1.00E+02 | 1.25E+01 | 3.33E+01 | 1.00E+02 | 1.39E+03 | 4.96E+02 | 0.138 | Gr/LiFePO$_4$-nano |
| 1.00E+02 | 2.50E+01 | 3.33E+01 | 1.00E+02 | 1.39E+03 | 5.08E+02 | 0.141 | Nano-Si/LiFePO$_4$-n |
| 1.00E+02 | 1.92E+00 | 3.33E+01 | 1.00E+02 | 1.39E+03 | 4.85E+02 | 0.135 | Li$_4$Ti$_5$O$_{12}$/LiFePO$_4$-n |
| 2.50E+01 | 4.81E-01 | 8.33E+00 | 2.50E+01 | 3.47E+02 | 1.21E+02 | 0.00337 | Li$_4$Ti$_5$O$_{12}$/LiFePO$_4$-n |
| 1.00E+02 | 1.92E+00 | 3.33E+01 | 1.00E+02 | 2.50E-05 | 2.35E+02 | 6.53E-02 | Li$_4$Ti$_5$O$_{12}$/f-CNM |
| 1.00E+00 | 1.92E+00 | 1.33E+00 | 1.00E+00 | 2.50E-05 | 5.26E+00 | 1.46E-03 | Li$_4$Ti$_5$O$_{12}$/f-CNM |
| 1.00E-02 | 1.92E+00 | 1.33E-02 | 1.00E-02 | 2.50E-05 | 1.96E+00 | 5.43E-04 | Li$_4$Ti$_5$O$_{12}$/f-CNM |
| 1.00E-02 | 1.92E+00 | 1.00E-02 | 1.00E-04 | 2.50E-05 | 1.94E+00 | 5.40E-04 | Li$_4$Ti$_5$O$_{12}$/f-CNM |
| 2.50E-01 | 0.00E+00 | 3.33E-01 | 2.25E-04 | 2.50E-05 | 5.84E-01 | 1.62E-04 | Li foil/f-CNM |
| 2.50E-01 | 0.00E+00 | 3.33E-01 | 2.25E-02 | 2.50E-05 | 6.06E-01 | 1.68E-04 | Li foil/f-CNM |
| 2.25E+00 | 0.00E+00 | 3.33E-01 | 2.25E+00 | 2.50E-05 | 4.83E+00 | 1.34E-03 | Li foil/f-CNM |
| 2.25E+00 | 0.00E+00 | 3.33E-01 | 1.00E+02 | 2.50E-05 | 1.03E+02 | 2.85E-02 | Li foil/f-CNM |

Several significant observations can be made from the data of Table 1(a) and (b):

(1) Conventional lithium ion batteries featuring a micron-sized graphite particle anode (graphite diameter=20 μm) and a micron-sized LiFePO$_4$ (particle diameter=1 μm) would require several hours (e.g. 8.4 h) to complete the required lithium ion diffusion process. This is why conventional lithium ion batteries exhibit very low power densities (typically 100-500 W/Kg).

(2) This problem of a long diffusion time can be partially alleviated by using nano-scaled particles (e.g., 8 minutes if both the anode and cathode active material particle diameters are 100 nm).

(3) In contrast, for the lithium super-batteries featuring a functionalized carbon cathode (e.g. f-CNT, f-NGP, or f-disordered carbon) and a Li$_4$Ti$_5$O$_{12}$ anode, the required diffusion times are between 235 sec (<4 minutes) for a cathode thickness of 200 μm and 1.96 sec for an ultra-thin cathode (e.g., 0.3 μm LBL f-CNT as prepared by the layer-by-layer method of the MIT research group [S. W. Lee, et al, *Nature Nanotechnology*, 5 (2010) 531-537]). This is 2-3 orders of magnitude faster as compared with the conventional lithium-ion batteries with both the anode and cathode particles having a diameter of 100 nm.

(4) For the lithium super-batteries, the electrode thickness is a dominating factor. For instance, in the case of using lithium metal foil as the anode, the total diffusion time can be as short as <0.6 sec (when the cathode thickness is 0.3 μm or 3 μm), which increases to 103 sec (still less than 2 minutes) when the cathode thickness is 200 μm.

(5) The above observations imply that the lithium super-batteries should have an extraordinary power density, particularly when the electrodes are ultra-thin. This is why Lee, et al. at MIT were able to report a power density >>100 Kw/Kg for their lithium super-battery cells having a LBL f-CNT cathode of 0.3 μm thick. However, a useful electrode size is 100-300 μm and the cells with a cathode thickness of 0.3-3.0 μm have very limited practical utility value. The exceptionally high power densities observed for the lithium super-batteries with a LBL f-CNT cathode by Lee, et al are due to the ultra-thin cathode thickness (0.3 μm). This is not just a speculation and, as a matter of fact, the data in FIG. S7 of Lee, et al asserted that the power density of their f-CNT super-batteries dropped by an order of magnitude when the cathode thickness was increased from 0.3 μm to 3 μm. Although Lee, et al did not provide any data on a thicker f-CNT electrode-based super-battery (e.g., cathode thickness of 200 μm), one can reasonably expect that the power density should be further reduced by 1-2 orders of magnitude. Thus, the power densities observed with our lithium batteries containing a functionalized disordered carbon cathode are at least as good as those of f-CNT-based super-batteries.

(6) Although to a lesser extent, the energy density of super-batteries with a functionalized nano carbon cathode should also be dependent upon the electrode thickness. For instance, the data reported by the MIT group [Lee, et al] indicate that, given comparable scan rates (current densities), the energy density of a super-battery decreases significantly (up to 30%) when the LBL CNT cathode thickness increases from 0.3 to 3 μm. Although our cathode thickness is in the range of 50-300 μm, the densities observed with our lithium batteries containing a functionalized disordered carbon cathode are as good as those of f-CNT-based super-batteries.

We claim:

1. A rechargeable lithium battery or supercapacitor comprising a positive electrode, a negative electrode, a porous separator disposed between the two electrodes, and a lithium-containing electrolyte in physical contact with the two electrodes, wherein the positive electrode comprises a disordered carbon material as a cathode active material having a functional group that reversibly reacts with a lithium atom or ion during charge and discharge cycles of said battery or supercapacitor and wherein said disordered carbon material is selected from a soft carbon, hard carbon, polymeric carbon or carbonized resin, meso-phase carbon, coke, carbonized pitch, carbon black, activated carbon, or partially graphitized carbon and said functional group is selected from —COOH, =O, —OH, —NH$_2$, an oxygen-containing group attached to a carbon atom, —OR, or —COOR, where R is a hydrocarbon radical.

2. The rechargeable lithium battery or supercapacitor of claim 1 wherein said disordered carbon material is formed of two phases with a first phase being graphite crystals or stacks of graphene planes and a second phase being non-crystalline carbon and wherein the first phase is dispersed in the second phase or bonded by the second phase.

3. The rechargeable lithium battery or supercapacitor of claim 1 wherein said disordered carbon material contains less than 90% by volume of graphite crystals and at least 10% by volume of non-crystalline carbon.

4. The rechargeable lithium battery or supercapacitor of claim 1 wherein said disordered carbon material has a porous structure having a pore size in the range of 1 nm and 50 nm.

5. The rechargeable lithium battery or supercapacitor of claim 1 wherein said disordered carbon material is porous and characterized by having a specific surface area of at least 100 m$^2$/g.

6. The rechargeable lithium battery or supercapacitor of claim 1 wherein said disordered carbon material is porous and characterized by having a specific surface area of at least 500 m$^2$/g.

7. The rechargeable lithium battery or supercapacitor of claim 1 wherein said disordered carbon material is porous and characterized by having a specific surface area of at least 1,000 m$^2$/g.

8. The rechargeable lithium battery or supercapacitor of claim 1 wherein said disordered carbon material is porous and characterized by having a specific surface area of at least 1,500 m$^2$/g.

9. The rechargeable lithium battery or supercapacitor of claim 1 wherein said negative electrode comprises an electrode active material capable of absorbing or desorbing lithium.

10. The rechargeable lithium battery or supercapacitor of claim 1 wherein said positive electrode comprises a disordered carbon structure having a functional group selected from —COOH, =O, —OH, —NH$_2$, —OR, —COOR, or an oxygen-containing group attached to a carbon atom of said disordered carbon structure, where R is a hydrocarbon radical and wherein the negative electrode comprises an electrode active material capable of absorbing or desorbing lithium.

11. The rechargeable lithium battery or supercapacitor of claim 9 wherein said electrode active material is selected from lithium metal, a lithium metal alloy, a mixture of lithium metal or lithium alloy with a lithium intercalation compound, a lithiated compound, lithiated titanium dioxide, lithium titanate, lithium manganate, a lithium transition metal oxide, Li$_4$Ti$_5$O$_{12}$, or a combination thereof.

12. The rechargeable lithium battery or supercapacitor of claim 11, wherein the lithium intercalation compound or lithiated compound is selected from the following groups of materials, which are capable of absorbing or desorbing lithium ions or atoms:
(a) Silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), their alloys with lithium, and mixtures thereof;
(b) Alloys or intermetallic compounds of Si, Ge, Sn, Pb, Sb, Bi, Zn, Al, Ti, Co, Ni, Mn, Cd, and their alloys with lithium;
(c) Oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof, and lithiated species thereof; and
(d) Salts or hydroxides of Sn.

13. The rechargeable lithium battery or supercapacitor of claim 10 wherein said electrode active material is selected from lithium metal, a lithium metal alloy, a mixture of lithium metal or lithium alloy with a lithium intercalation compound, a lithiated compound, lithiated titanium dioxide, lithium titanate, lithium manganate, a lithium transition metal oxide, Li$_4$Ti$_5$O$_{12}$, or a combination thereof.

14. The rechargeable lithium battery or supercapacitor of claim 13, wherein the lithium intercalation compound or lithiated compound is selected from the following groups of materials, which are capable of absorbing or desorbing lithium ions or atoms:
(a) Silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;
(b) Alloys or intermetallic compounds of Si, Ge, Sn, Pb, Sb, Bi, Zn, Al, Ti, or Cd;
(c) Oxides, carbides, nitrides, sulfides, phosphides, selenides, tellurides, or antimonides of Si, Ge, Sn, Pb, Sb, Bi, Zn, Al, Fe, Ti, Mn, or Cd and mixtures or composites thereof, and lithiated species thereof; and
(d) Salts or hydroxides of Sn.

15. The rechargeable lithium battery or supercapacitor of claim 11 wherein said electrode active material is in a fine powder form having a dimension less than 1 μm.

16. The rechargeable lithium battery or supercapacitor of claim 13 wherein said electrode active material is in a fine powder form having a dimension less than 0.5 μm.

17. The rechargeable lithium battery or supercapacitor of claim 13 wherein said electrode active material is in a fine powder form having a dimension less than 100 nm.

18. The rechargeable lithium battery or supercapacitor of claim 9 wherein said electrode active material is selected from lithium cobalt oxide, lithium nickel oxide, lithium manganese oxide, lithium manganese oxide, lithium vanadium oxide, lithium mixed metal oxide, lithium iron phosphate, lithium vanadium phosphate, lithium manganese phosphate, a lithium transition metal phosphate, lithium mixed metal phosphate, lithiated metal sulfide, or a combination thereof.

19. The rechargeable lithium battery or supercapacitor of claim 10 wherein said electrode active material is selected from lithium cobalt oxide, lithium nickel oxide, lithium manganese oxide, lithium manganese oxide, lithium vanadium oxide, lithium mixed metal oxide, lithium iron phosphate, lithium vanadium phosphate, lithium manganese phosphate, a lithium transition metal phosphate, lithium mixed metal phosphate, lithiated metal sulfide, or a combination thereof.

20. The rechargeable lithium battery or supercapacitor of claim 18 wherein said electrode active material is in a fine powder form having a dimension less than 0.5 μm.

21. The rechargeable lithium battery or supercapacitor of claim 19 wherein said electrode active material is in a fine powder form having a dimension less than 100 nm.

22. The rechargeable lithium battery or supercapacitor of claim 1 wherein said disordered carbon material has an oxygen content in the range of 5% to 45% by weight.

23. The rechargeable lithium battery or supercapacitor of claim 1 wherein said disordered carbon material has an oxygen content in the range of 5% to 35% by weight based on the total graphene platelet weight.

24. The rechargeable lithium battery or supercapacitor of claim 1 wherein said disordered carbon material has an oxygen content in the range of 10% to 25% by weight based on the total graphene platelet weight.

25. The rechargeable lithium battery or supercapacitor of claim 1 wherein said electrolyte comprises a lithium salt-doped ionic liquid.

26. The rechargeable lithium battery or supercapacitor of claim 1 wherein at least one of the two electrodes further comprises a nano material selected from a carbon nano-tube, carbon nano-fiber, nano-wire, metal oxide nano-wire or fiber, conductive polymer nano-fiber, or a combination thereof.

27. The rechargeable lithium battery or supercapacitor of claim 1 wherein said device provides an energy density of no less than 100 Wh/kg and power density no lower than 15 Kw/kg, all based on the total electrode weight.

28. The rechargeable lithium battery or supercapacitor of claim 1 wherein said device provides an energy density of no less than 200 Wh/kg and power density no lower than 10 Kw/kg, all based on the total electrode weight.

29. The rechargeable lithium battery or supercapacitor of claim 1 wherein said device provides an energy density of no less than 300 Wh/kg and power density no less than 5 Kw/kg, all based on the total electrode weight.

30. The rechargeable lithium battery or supercapacitor of claim 1 wherein said positive electrode has a thickness greater than 50 μm.

31. The rechargeable lithium battery or supercapacitor of claim 1 wherein said positive electrode has a thickness greater than 100 μm.

* * * * *